United States Patent [19]

Barnich

[11] 3,881,174

[45] Apr. 29, 1975

[54] PERIPHERAL INTERRUPT APPARATUS FOR DIGITAL COMPUTER SYSTEM

[75] Inventor: Richard G. Barnich, Grand Blanc, Mich.

[73] Assignee: Process Computer Systems, Inc., Flint, Mich.

[22] Filed: Jan. 18, 1974

[21] Appl. No.: 434,389

[52] U.S. Cl. .......... 340/172.5

[51] Int. Cl. .......... G06f 3/00

[58] Field of Search .......... 340/172.5

[56] References Cited

UNITED STATES PATENTS

| | | | |
|---|---|---|---|
| 3,618,037 | 11/1971 | Wollum et al. | 340/172.5 |
| 3,631,404 | 12/1971 | Bernhardt et al. | 340/172.5 |
| 3,713,109 | 1/1973 | Hornung | 340/172.5 |
| 3,725,871 | 4/1973 | Heuttner et al. | 340/172.5 |
| 3,728,693 | 4/1973 | Williams | 340/172.5 |
| 3,742,148 | 6/1973 | Ledeen et al. | 340/172.5 |
| 3,744,028 | 7/1973 | Kirk | 340/172.5 |
| 3,766,531 | 10/1973 | Cooper et al. | 340/172.5 |

*Primary Examiner*—Gareth D. Shaw
*Assistant Examiner*—John P. Vandenburg
*Attorney, Agent, or Firm*—Krass & Young

[57] ABSTRACT

Each of a plurality of peripherals is connected to a central processing unit by a common bus including an address section, a data section and various control lines. The input/output logic for each peripheral device is formed on a separate circuit board which plugs into a chassis containing a hard wired address for each board location. A device may request an interrupt by a signal sent over one of the control lines and an interrupt acknowledge signal causes the requesting device to provide its address to the address bus. This informs the computer as to the address of the interrupting device. Simultaneously, a comparator device recognizes its address on the bus and may provide stored information relating to the status of the peripheral to the computer over the data channel.

8 Claims, 4 Drawing Figures

PERIPHERAL INTERRUPT APPARATUS FOR DIGITAL COMPUTER SYSTEM

1. BACKGROUND OF THE INVENTION

This invention relates to digital computer systems employing peripherals connected to a central processing unit via an input/output bus and more particularly to peripheral associated logic circuitry which allows the execution of extremely rapid interrupt routines.

2. PRIOR ART

Bus type channels are often used to connect a plurality of peripheral input/output devices such as keyboards, printers, processing terminals and the like to a digital computer. Each device connected to the bus receives all of the information sent out by the central computer but responds to only those signals which are prefixed with the devices' unique address as transmitted on an address line section of the bus. When one of the peripheral devices has information to transmit to the central processing unit (CPU) it presents a logical 1 to a control line forming part of the bus to request an interrupt sequence and when the CPU reaches a point in its operation when it can respond to the interrupt request it acknowledges the interrupt on another control line. The interrupting peripheral, upon receiving this acknowledge signal, transmits its address to the CPU on the address bus. After receiving this address the computer addresses the interrupting peripheral on the address bus and requests the status of the peripheral by a signal sent over a third control line. This procedure of first identifying the interrupting peripheral, next requesting the status of the peripheral and then providing that status is relatively slow and in certain classes of systems wherein the peripherals provide large quantities of data to the central computer, and accordingly interrupt routines are executed very frequently, this interrupt acknowledge routine time may pose serious speed restraints on the total system.

It is one of the principal objects of the present invention to provide a computer system wherein the time required for a peripheral to identify itself and provide its status to a CPU is substantially diminished relative to this prior art technique.

3. SUMMARY OF THE INVENTION

The present invention relates to a unique form of I/O control logic for interfacing peripherals to a bus connecting to a central computer which allows a peripheral upon receiving an acknowledgment from the computer of an interrupt request which the peripheral previously generated, to simultaneously provide the CPU with its address and status, thereby appreciably shortening the typical interrupt routine time relative to that required by prior art systems. The peripheral circuitry which performs this operation is very simple and not appreciably more expensive than the circuitry of conventional peripheral I/O interfaces. In essence, this economy of circuitry is achieved by adding a relatively few logical components to a conventional I/O control interface, which components cause the interface circuitry to perform the tasks associated with the unique function as well as the tasks that the circuit conventionally performs in the I/O control.

The preferred embodiment of the invention, which will subsequently be described in detail, utilizes the type of I/O interface wherein the address of each peripheral is permanently established by wiring and/or switches associated with that peripheral's I/O circuit card and/or a chassis into which a card is plugged and which carries the bus connections to the card. The preferred embodiment of the peripheral interface also employs a comparator connected between the address section of the bus and the wired memory to provide an output signal to the balance of the I/O circuitry, causing it to perform some function commanded by a signal provided on one of the control lines, when an address transmitted over the address bus, usually by the CPU, identifies with that device's own unique address. The preferred embodiment of the invention also uses the type of I/O control card wherein a signal from the computer acknowledging an interrupt request is passed on from one peripheral device to the next until it reaches a peripheral device which transmitted a previously unacknowledged interrupt request. That device then answers and terminates the propogation of the acknowledgment. This arrangement provides for the situation wherein more than one peripheral device has requested an interrupt before the computer can acknowledge the interrupt. The relative priority of the peripheral devices in obtaining satisfaction of an interrupt request is thus based on their position in the pass-on chain.

In the preferred embodiment of the invention, when a peripheral originates an interrupt request a flip-flop is set in its associated I/O circuit. When an acknowledge request is received and that flip-flop is still in its set state the device connects its hard wired address to the address bus. This serves to identify the interrupting device to the CPU and also causes the comparator within that I/O circuit to recognize an identity between its own address and the address on the address bus, generating an enabling signal which in turn causes the peripheral unit to respond to the appropriate signal on the control lines. Either the I/O circuit itself, or an associated controller disposed between the I/O circuit and the CPU causes the status request control line to become true when an interrupt acknowledge signal is received. Alternatively, the computer itself may be programmed to send out an interrupt acknowledge signal and a status request signal simultaneously. In either event, the I/O circuit which originated the interrupt request is then triggered to transmit its status, as stored in registers associated with the I/O circuit, to the CPU over the data section of the bus. By this arrangement the interrupting peripheral transmits both its address and its status to the CPU simultaneously, obviating the need for the CPU to originate a status request after receiving and processing the address of the interrupting peripheral and then awaiting the status response from the peripheral before continuing with its further processing. The peripheral might alternatively be arranged to transmit a segment of collected data rather than the status of the peripheral.

The present invention thus achieves a substantial reduction in the time required to service interrupts through use of circuitry which is largely incorporated in conventional, slower I/O interfaces through the addition of a relatively few additional components which cause those existing circuits to perform new functions as well as those they previously performed.

Other objectives, advantages and applications of the present invention will be made apparent by the following detailed description of a preferred embodiment of the invention. The description makes reference to the accompanying drawings in which:

FIG. 3 is a plan view of a plug-in circuit board, of the type employed with the present invention, its back plane connector and associated peripheral connector.

Figure 1:
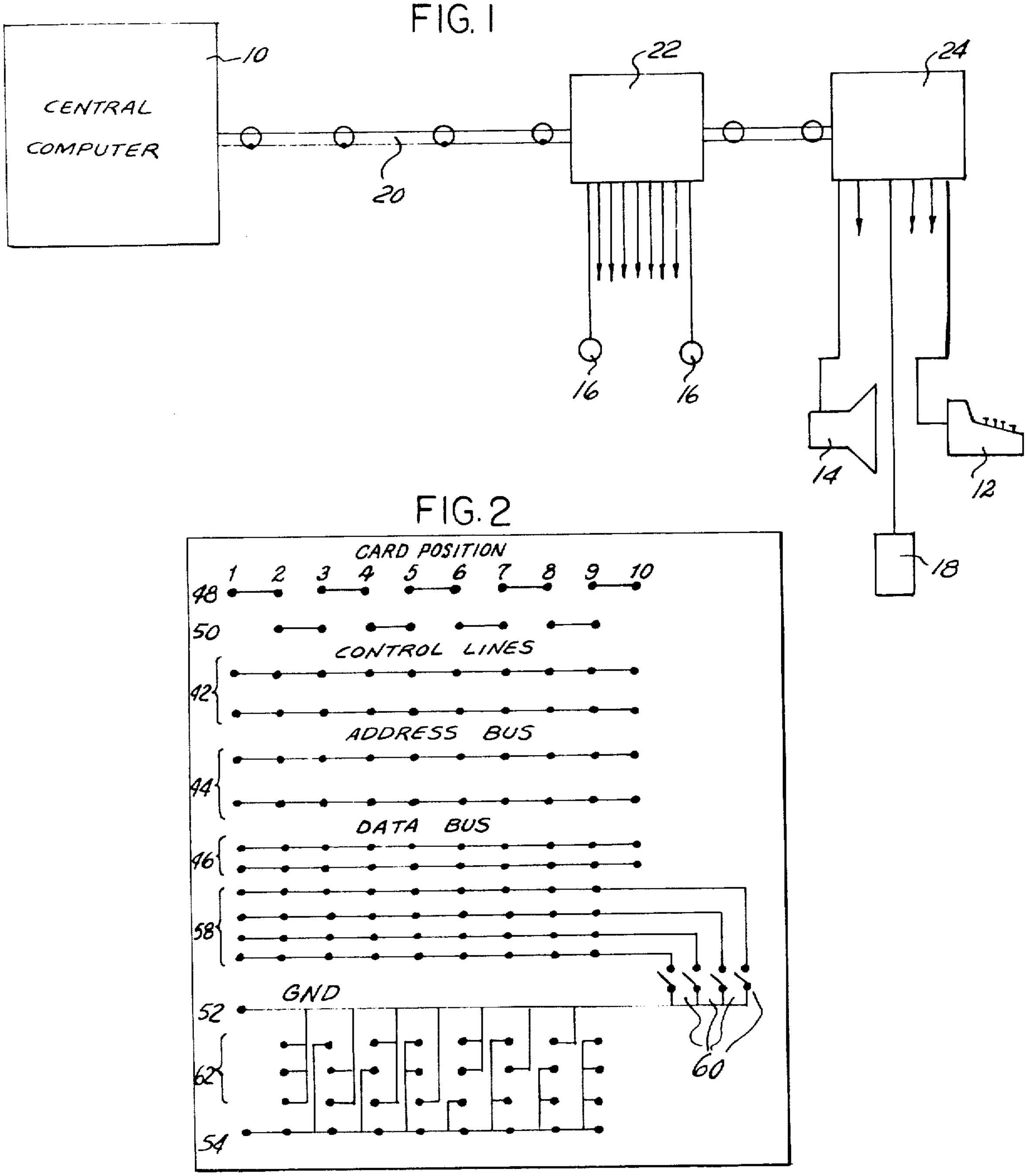
FIG. 1 is a schematic diagram of a computer-peripheral system embodying the present invention.

The present invention is preferably employed in a system having at least one central computer 10 which may receive information from and transmit information to a plurality of peripheral devices such as a keyboard 12, a cathode ray tube display 14, sensors 16 which measure the status of a process, and the like. These peripheral devices may include a secondary computer 18 which may itself be connected to other input and/or output devices via another input/output channel. While any of these peripheral devices may themselves process data to a greater or lesser extent, the present invention is concerned with the process wherein they transfer data to and receive data from the central computer.

The computer 10 is connected to all of the peripherals via a bus 20 consisting of a plurality of conductors. With one exception, which will be subsequently noted, all of the connectors of the bus are electrically connected to each of the peripheral devices 12, 14, 16, 18, etc., by connections made through chassis 22, 24 and the like. Bus 20 connects to the back plane wiring of each chassis. Each chassis is adapted to receive a plurality of printed circuit boards 26 and contains a plurality of female connector strips 28, each of which is adapted to make contact with male connector strip 30 associated with one end of a printed circuit board. The chassis includes edge guides 32 consisting of channels which receive the edges of the circuit board and allow the connectors 30 to be plugged into the female connector 28 so as to make contact with all of the bus elements through the back plane wiring.

The board 26 contains various digital electronic circuitry in the area generally indicated at 34 which is not illustrated in detail in FIG. 3. A second male connector strip 36 disposed at the opposite end of the circuit board 26 from the strip 30 projects outwardly from the chassis and connects to one of the peripherals through a female connector 38 which makes connection with the strip 36 and a cable 40 connected between the peripheral and the female connector 38.

Preferably, one card 26 is associated with each peripheral device. That card contains all of the input/output circuitry required for data exchange with the computer. The bus 20 is connected to the back plane wiring on the chassis 22, 24, etc., by a circuit board 26 and the bus between the chassis also makes connection with the back plane wiring through circuit boards which may contain various buffering electronics of a type well known in the art.

Figures 1, 2:
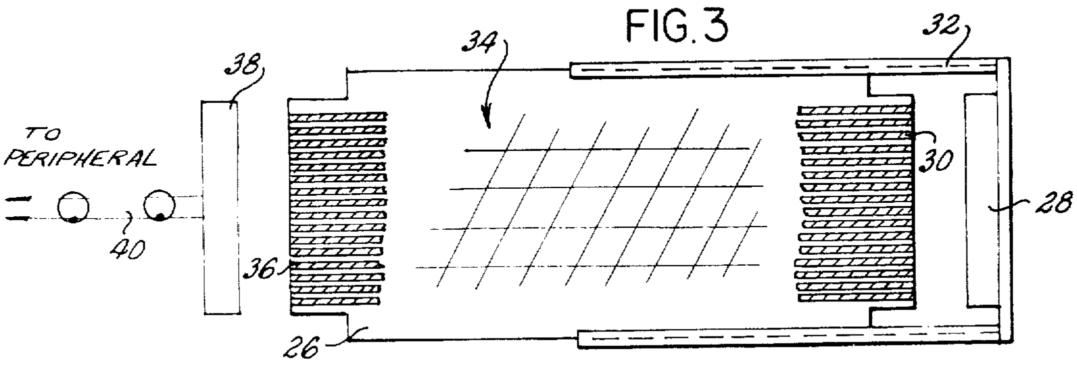
FIG. 2 is a schematic view of portions of the back plane wiring and address encoding switches of the preferred embodiment of the invention.

A somewhat representational view of a typical back plane wiring is illustrated in FIG. 2. It should be understood that the back plane typically contains a substantially larger number of connector elements than those illustrated in FIG. 2, the number having been reduced for purposes of clarity of illustration.

The back plane illustrated in FIG. 2 is adapted to retain an input card, an output card, and eight peripheral associated cards. Each card plugs into one of the vertical lines of the back plane matrix. The card that plugs into the left-most vertical row of connector elements is typically an input card containing all of the lines of the bus. The card that plugs into the right-hand most vertical line of elements is typically an output card also carrying all of the bus elements for provision to the next chassis.

The bus includes a plurality of control lines 42 although only two control lines are illustrated in FIG. 2 for purposes of simplification. The bus also includes a plurality of address lines 44. Again, only two address lines are shown although typically eight or more will be required. The bus further includes a plurality of data lines 46. Again, only two are illustrated although at least as many as the number of address lines are required for the practice of the present invention. The bus also contains one special control line termed the interrupt acknowledge line. This line is joined at connector 48 to card No. 1 and another connector 50 connects card No. 1 with card No. 2. Another connection 50 joins card 2 to card 3 and so on. In this manner elements on each circuit board disposed electrically between the connectors 48 and 50 are essentially connected in series by the back plane wiring.

The back plane wiring also includes four lines 58 which connect to each card position and are connectable to the ground line 52 through four single pole switches 60. These switches may be opened or closed and signify in effect the address of the chassis which becomes four digits of an eight-digit address for each card plugged into the chassis. The address of each card is completed by a four bit code, unique to that card within a chassis, which is wired into the back plane. For example, the connectors associated with card position 2 include three elements 62 which are all connected to the ground line 52 by back plane elements and one element connected to a line 54 which carries a positive potential relative to ground. Three of the connectors associated with card position 3 are connected to ground, while the other two are connected to the positive voltage. In this manner each of the eight peripheral card positions is given a unique address within the chassis. This four bit address portion, combined with the four bits provided by the line 58, uniquely identifies each peripheral card within the computer system.

Accordingly, each of the cards that plug into positions 2 through 9 receive a unique eight bit identifying address made up of four common bits provided by the lines 58 and the four unique bits associated with the back-plane wire connectors 54 and 62; the entire data bus, the entire address bus, and the entire set of control lines. Additionally, each card receives the interrupt acknowledge line of the previous card and provides an output from its interrupt acknowledge circuitry to the succeeding card.

Figure 4:
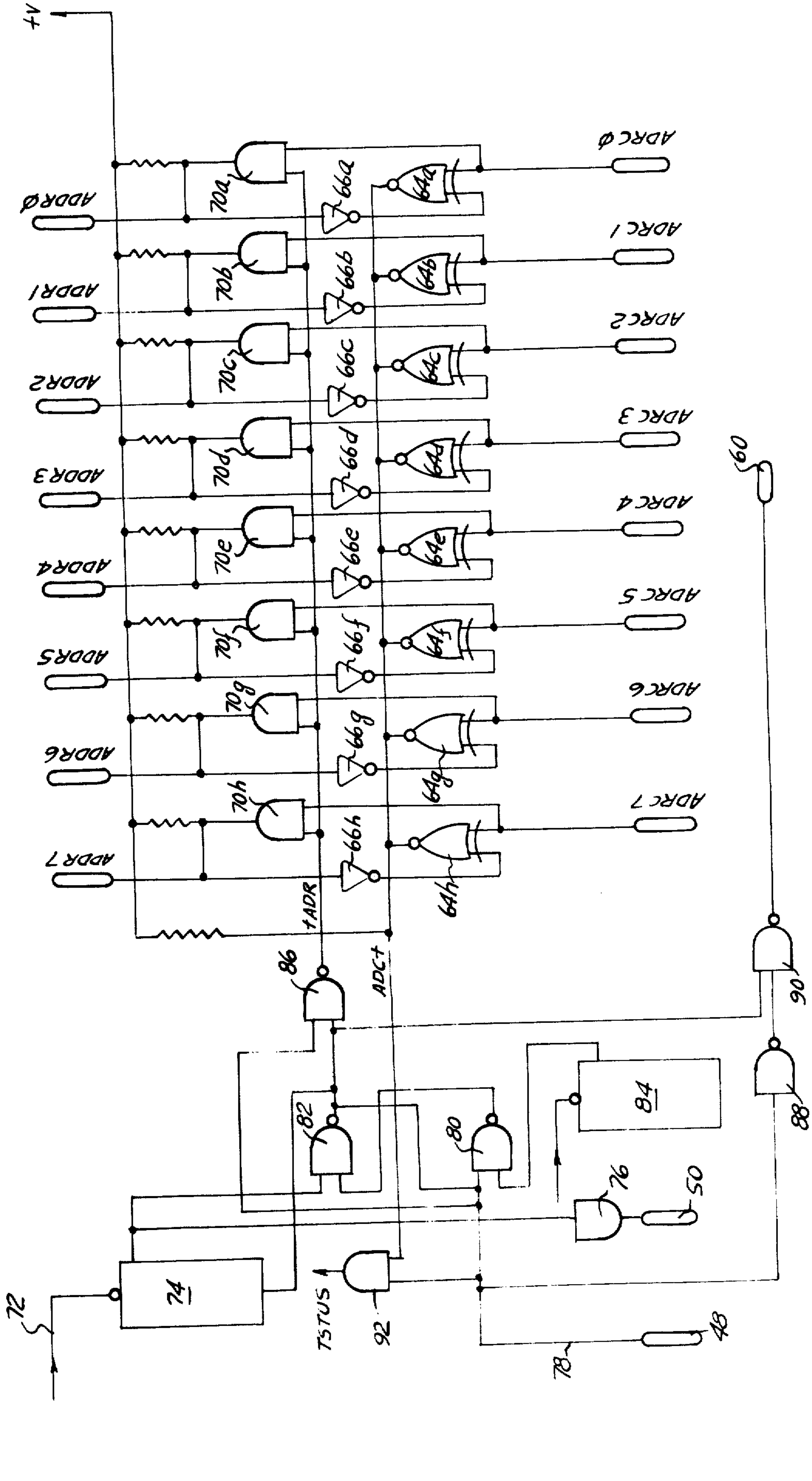
FIG. 4 is a schematic diagram of the relevant portion of the I/O circuitry formed on a board of the type of FIG. 3.

That portion of a typical 9 interface circuit which relates to the present invention is illustrated in FIG. 4. The eight lines of address received from the back plane are denoted ADRC 0 through 7. Each of these is provided to one input of one of a series exclusive NOR gates denoted 64*a* through 64*h*. The eight lines of the address bus are denoted ADDR 0 through ADDR 7 and each of these lines connects to the other conditioning input of one of the exclusive NOR gates 64 through amplifiers 66*a* through 66*h*. The output of all the NOR gates are connected together and are connected to the +V line through a resistor 68. If any of the exclusive NOR outputs are low, they effectively ground the output line which is denoted ADC+ (positive address comparison). Only when all of the outputs are high, indicating a positive comparison between each digit contained on the address bus and each digit of the boards address does the line ADC+ become high.

The back plane address lines ADRC 0–ADRC 6 are also each connected to one of a series of AND gates 70*a* through 70*h*. The other conditioning input to each of the AND gates consists of a line labeled TADR (transmit address). When this line goes high, the address contained in the back plane wiring and switches is provided to the address bus.

When a peripheral device has assembled a message to be transmitted to the computer, appropriate circuitry which is conventional in the art provides a signal on line 72 to the set input of an interrupt request flip-flop 74 contained on the board. The set output of the interrupt request flip-flop 74 is provided through a NOR gate 76 to the control line on the bus which denotes an interrupt request. The bus 20 carries this signal to the central computer 10.

When the computer reaches an appropriate point in its programmed cycle of operation to respond to the request, it provides an output on a control line as an interrupt acknowledgment. This control line differs from the other control lines in the system in that instead of providing its signal to all of the peripherals in parallel, its signal is provided to the units serially and sequentially, each unit passing the request signal to the subsequent unit until the first peripheral is reached that has originated an unanswered interrupt request. These signals are passed from unit to unit within a chassis by back plane conductors extending between the connector points 48 and 50.

When the interrupt acknowledge signal is received on line 78 by a particular I/O circuit, it is supplied to a pair of NAND gates 80 and 82 connected as a NAND latch. The output of the gate 80 is provided as the input to the gate 82 and vice versa. The other enabling input to the gate 82 comes from the SET output of the interrupt request flip-flop 74. The gate 80 has an enabling input from an interrupt enable flip-flop 84. A low signal on the interrupt acknowledge line 78 will force the latch into a state where the output from the gate 80 is high, while a low output from the SET state of the interrupt request flip-flop 74 will force the latch into a condition where the output from gate 82 is high. Assuming that an interrupt signal on line 72 is provided to the SET input of the interrupt request flip-flop 74, an output will be provided from gate 82 to a NOR gate 86 that has the interrupt acknowledge signal as its other input. When this input is received, an output is provided to the AND gates 70 causing the unit to provide its address to the address bus. At the same time, the interrupt acknowledge signal causes the latch to be reset so that the output from gate 80 is high. A set signal from the interrupt enable flip-flop 84 is necessary to allow the latch to change state after an interrupt request signal is received.

If the output of gate 80 is high when an interrupt acknowledge signal is received, signifying the absence of an unanswered interrupt request, a pair of NOR gates 88 and 90 provide an interrupt acknowledge output at contact 60.

The provision of the wired address to the address bus causes the ADC+ line to go high. An AND gate 92, conditioned by ADC+ and interrupt acknowledge provides a signal to the balance of the I/0 interface circuitry causing it to transmit its status in the conventional manner on the data bus. Specific circuitry for storing the status of the associated peripheral and for providing that status signal, in parallel, to the data lines of the bus is conventional and is not illustrated in detail. In FIG. 4, the control line for triggering this function is termed TSTUS (transmit status).

Summarizing the operation of the circuitry illustrated in FIG. 4, the cycle begins when the associated interface circuitry provides an input on line 72 to the interrupt request flip-flop 74 setting that flip-flop. The SET output is provided to the gate 82. Assuming that the latch was disposed with a true output from gate 80 previously, the input from the flip-flop 74 causes the latch to change state so the output from gate 82 becomes true. Simultaneously, a signal is sent out on the interrupt request control line of the bus through gate 76.

When the computer is ready to service the interrupt request, an interrupt acknowledge signal is provided on line 78 to the NOR gate 86. If the output from the gate 82 is high, the NOR gate 86 will provide a TADR signal causing the AND gate 70 to apply the back plane address to the address bus. The resulting identity between the status of the address bus and the back plane addresses causes all of the NOR gates 64 to provide high outputs causing a true signal on the ADC+ line. This signal, occurring simultaneously with the acknowledge interrupt signal, and acting through gate 92, causes the unit to transmit its status on the data portion of the bus so that the status and the address of the unit are simultaneously provided to the central computer.

Having thus described my invention, I claim:

1. A digital computer system, comprising a central processing unit; a plurality of peripheral devices; connecting circuitry extending between the central processing unit and each of the plurality of peripheral devices including an address bus, a data bus and a single interrupt request line; a permanent unique address source associated with each peripheral device; a comparator associated with each device connected to the address bus and to the address source and operative to provide a signal to the device on the occurrence of identity between an address transmitted on the address bus and the address source of that device; means within the peripheral device for generating an interrupt request signal on the interrupt request line; means in the peripheral device operative upon receiving an interrupt acknowledge signal from the central processing unit on said connecting circuitry following the transmission of an interrupt request signal by that device for connecting said address source to the address bus; and circuitry for providing signals relating to the status of circuitry on the card to the data bus in response to the simultaneous occurrence of said signal from the comparator and an interrupt acknowledge signal so as to simultaneously identify the interrupting peripheral device and provide additional information encoded in the last said signal to the central processing unit.

2. The system of claim 1 wherein the provision of said signals to said data bus is further conditioned by a status request signal generated within the peripheral device in response to an interrupt acknowledge signal received from the central processing unit.

3. The system of claim 1 wherein each peripheral device is connected to said buses through circuitry formed on a plug-in circuit card and each of said circuit cards is electrically connected to back plane wiring associated with a chassis.

4. The system of claim 3 wherein said unique address source for each peripheral is at least partially constituted by said back plane wiring.

5. The system of claim 4 wherein at least a portion of the unique address source is constituted by switches associated with said chassis and all of the circuit boards associated with said chassis share such common address parts.

6. A computer system, comprising: a central processing unit; a plurality of peripheral devices; a plurality of circuit cards, one connected to each peripheral device; a chassis having back plane wiring and connectors adapted to receive a plurality of said circuit boards; address storage means associated with said chassis operative to provide each circuit board plugged into the chassis with a unique digital address; a bus connecting said central processing unit with said chassis and including an address section a data section and a single interrupt request line· .omparator means formed on each circuit board and connected to the address section of the bus and to the address storage means and operative to provide an output signal upon identity occurring between the contents of the address storage means and the address transmitted on the bus; circuitry on each circuit board for providing an interrupt request signal to the central processing unit over the bus; circuitry on each circuit board for connecting the address storage means to the address section of the bus upon receipt of an interrupt acknowledge signal from the central processing unit following the provision of an interrupt request signal by that circuit board; and circuitry on each board responsive to an output from the comparator and the simultaneous occurrence of an interrupt acknowledge signal to provide signals relating to the status of circuitry on the card to the bus.

7. The computer system of claim 6 including a two-state device associated with each circuit board and adapted to be set into a first condition upon transmission of an interrupt request signal by that board, and to be reset into a second condition upon receipt of an interrupt acknowledge signal from the computer; and circuitry associated with each board conditioning the connection of the address storage means to the address section of the bus upon the status of said two-state device.

8. The system of claim 7 wherein the bus includes conductors interconnecting each adjacent circuit card, said conductors being operative to receive and pass along to the next circuit card an interrupt acknowledge signal from the computer if its two-state device is in a first condition and operative to provide an enabling signal to additional circuitry formed on the card if the output of the two-state device is in a second condition.

* * * * *